United States Patent [19]

Guiseley

[11] 4,443,486
[45] Apr. 17, 1984

[54] **MODIFIED EXTRACTIVE OF *EUCHEUMA COTTONII* SEAWEED AND COMPOSITION CONTAINING SAME**

[75] Inventor: Kenneth B. Guiseley, Hope, Me.

[73] Assignee: FMC Corporation, Philadelphia, Pa.

[21] Appl. No.: 242,799

[22] Filed: Mar. 11, 1981

Related U.S. Application Data

[63] Continuation-in-part of Ser. No. 138,947, Apr. 9, 1980, abandoned.

[51] Int. Cl.$^3$ .................... C08B 37/00; A23G 1/00; A23C 9/154
[52] U.S. Cl. .................... 426/584; 426/589; 426/575; 536/1.1; 536/114; 536/118; 536/122; 536/123
[58] Field of Search .................... 426/584, 589; 536/1, 536/118, 122, 123, 1.1, 114

[56] References Cited

U.S. PATENT DOCUMENTS

| | | | |
|---|---|---|---|
| 3,094,517 | 6/1963 | Stanley | 536/114 |
| 3,175,942 | 3/1965 | Anderson et al. | 536/118 |
| 3,176,003 | 3/1965 | Stancioff | 536/122 |
| 3,849,395 | 11/1974 | Moirano | 536/121 |
| 4,096,327 | 6/1978 | Guiseley | 536/118 |

FOREIGN PATENT DOCUMENTS 53-107990 9/1978 Japan .
54-117045 9/1979 Japan .

OTHER PUBLICATIONS

"Kappa-Carrageenan: A Study on its Physico-Chemical Properties, Sol-Gel Transition and Interaction with Milk Proteins," T. H. M. Snoeren, published by H. Veenman & Zonen B.V.-Wageningen (The Netherlands), 1976, pp. 8, 57–91.

Whistler, "Industrial Gums", Academic Press, New York, N.Y., 1959, pp. 65–66.

Smidsrod et al., "Carbohydrate Research", vol. 80, 1980, pp. C11–C16.

*Primary Examiner*—Johnnie R. Brown
*Attorney, Agent, or Firm*—Eugene G. Horsky

[57] ABSTRACT

A stabilizer for milk products comprised of a carrageenan extractive of *Eucheuma cottonii* seaweed having a water viscosity at 1.5% concentration and 75° C. of not less than 5 mPa.s and not more than about 20 mPa.s.

6 Claims, No Drawings

MODIFIED EXTRACTIVE OF *EUCHEUMA COTTONII* SEAWEED AND COMPOSITION CONTAINING SAME

This application is a continuation-in-part of U.S. application Ser. No. 138,947, filed Apr. 9, 1980, now abandoned.

This invention relates to a modified hydrocolloid or carrageenan extractive from the *Eucheuma cottonii* species of seaweed that is functional as a stabilizing agent in milk containing products.

Defined broadly, carrageenan is that group of galactan polysaccharides separated or purified from red algae (Rhodophyceae class) of Gigartinaceae, Solieriaceae, Hypneaceae and Phyllophoraceae families, and that have an ester sulfate content of 20% or more and are alternately $\alpha$1-3; $\beta$1-4 glycosidically linked. The above definition is applicable to the term "carrageenan" referred to herein alone or as identified by seaweed species.

The present invention, however, is concerned only with the carrageenan or hydrocolloid contained within or purified or separated from the *Eucheuma cottonii* species of seaweed (Solieriaceae family). Thus, in the description of the present invention, use is made of the terms "extractive", "extract", and "extracted", either alone, with, or applied to carrageenan or hydrocolloid, and it will be understood that such terms refer to the carrageenan component of *Eucheuma cottonii* species of seaweed, whether such carrageenan component is in its purified form; that is, physically separated or removed from such seaweed, or isolated within treated seaweed particulates which consist primarily of fibrous portions of seaweed that are comprised essentially of cellulose and hemicellulose.

Carrageenan from members of the class Rhodophyceae (red seaweeds) has been used for many years to modify the properties and texture of milk and milk products. For example, in its crudest form, that of merely sun-bleached, washed seaweed (Irish moss, i.e., *Chondrus crispus* species), carrageenan has been used for centuries to prepare a pudding known as blanc mange, by heating the seaweed in milk and allowing the milk, with or without sugar and flavorings, to cool, whereupon a gel having a flan or custard-like texture results.

As the industry evolved, attention was devoted to the purification of the active principle of carrageenan-bearing seaweeds, so that standardized products of commerce would become available. Initially, *Chondrus crispus* was the sole source of raw material, but with time, other seaweeds were found to contain carrageenan and were also used for its manufacture. Various of these were subsequently found to be richer in one of the two fractions, kappa and lambda, that *Chondrus crispus* carrageenan had been found to contain. For example, *Gigartina acicularis* and *Gigartina pistillata* contain a higher proportion of the non-water-gelling lambda carrageenan than most other carrageenan-bearing seaweeds, and *Eucheuma cottonii* contains essentially only kappa carrageenan. *Eucheuma cottonii*, as employed herein, is intended to include other names by which this species is known in the art, as for example, *Eucheuma edule* and *Eucheuma striatum*.

It is well known that carrageenan is unique in its ability to suspend cocoa in chocolate milk, and investigation has demonstrated that it is the kappa fraction that is most effective in accomplishing this. However, the very pure kappa carrageenan obtained from *Eucheuma cottonii* does not function well in this capacity.

In evaluating stabilizers for chocolate milk, it is common practice to prepare a series of milks containing the stabilizer at several concentrations, and to compare the viscosity of those milks with that of a control, prepared at the same time as the test milks, with a standard material at a fixed concentration.

In such evaluations, one test specific to the industry is the milk index of the stabilizer, which is hereafter described in detail, and which is the use level of the stabilizer that provides a viscosity which matches the viscosity of the control. It is also common practice in these evaluations to make visual observation of the milks undergoing test as to certain characteristics which are employed throughout the description and claims and are defined as follows:

Settling—A distinct layer of cocoa on the bottom of the bottle, resulting from inadequate stabilization. The adjectives heavy or light may be used as warranted.

Dust—A very mild case of settling, in which individual grains or clumps of cocoa are visible on the bottom of the bottle, but among which the milk is plainly visible. The adjective light may be applied.

Streaking—The existence of fine, dark, vertical lines in the lower portion of the bottle; considered to be a precursor of settling.

Ripple—Very weak gel formation, observed when looking down the neck of the bottle as the milk is poured out.

Blurp—A more distinct coherent gel having a weak, pudding-like consistency when poured from the bottle. Blurp and ripple are the result of overstabilization.

Separation (also referred to as "sag")—The presence of a light-colored layer at the top of the milk accompanied by a darker than normal lower portion containing the cocoa. It may or may not be accompanied by settling or dust.

Feathering—The existence of fine, light-colored vertical lines in the upper portion of the bottle; considered to be the initial stage of separation.

It is generally true that certain of these observations can be directly associated with specific problems. For example, settling, in any of its various degrees, results from under-stabilization; that is, an insufficiency of carrageenan, or from a carrageenan of low milk reactivity. Conversely, ripple and blurp result from too high a use level, or from the use of a carrageenan of excessive milk reactivity.

The term "spread" is also commonly used in conjunction with the testing of chocolate milk stabilizers. It refers to the concentration range over which the stabilizer produces a satisfactory chocolate milk product, i.e., one without settling or blurp. Purified Chondrus carrageenans characteristically have a spread of about 80 ppm, from about 120–200 ppm, whereas the normal products of commerce, containing relatively nonfunctional lambda carrageenan, salts, or sugar used for standardization, have a higher spread of about 120 ppm at a higher use level, such as 180–300 ppm.

Milk index and spread are important to the user of the product, since for him, they reflect cost and flexibility, respectively. Both of these come into play more today than in the past, because of the varied means of processing chocolate milk which have been developed. These processes vary in the extent of heating, rate of cooling, and range of shear stresses to which the milk is subjected due to heat exchangers, coolers, homogenizers, mixers, pumps, etc., and the dairyman must adjust the use level to different extents in order to balance off these factors, since they contribute to or detract from the performance of the stabilizer.

Described in U.S. Pat. No. 3,094,517 is a process for increasing the water gel strength and milk reactivity of carrageenan. This patented process involves an alkali treatment of seaweed, as for example, heating of *Chondrus crispus* in an aqueous medium containing calcium hydroxide in an amount that is over 10% of the weight of the seaweed. The temperature at which this process is carried out may range from 90° to 130° C. with a treatment period of from 3 to 6 hours.

Stated in this U.S. Pat. No. 3,094,517 is that as a concomitant of the increase in the milk reactivity obtained by the practice of the patented invention the improved mucilaginous material or carrageenan also has an increased ability to suspend cocoa in milk, with the amount of such material required for this purpose being inversely related to the milk reactivity of the mucilaginous material.

The process described in U.S. Pat. No. 3,094,517 is indeed useful for converting a carrageenan of poor cocoa suspending properties to one of excellent suspending properties, particularly if the carrageenan is from a seaweed having a naturally high proportion of kappa carrageenan, such as *Chondrus crispus*. As the *Eucheuma cottonii* seaweed contains essentially only kappa carrageenan, it would be assumed that, when treated in accordance with the process of U.S. Pat. No. 3,094,517, the carrageenan from *Eucheuma cottonii* would excel in its milk properties. Yet, it has been observed repeatedly over a period of many years that such alkali-treated kappa carrageenan from *Eucheuma cottonii* is totally unacceptable as a stabilizer for chocolate milk. Its use very characteristically produces separation; that is, a light-colored layer at the top of the milk accompanied by a darker than normal lower portion containing the cocoa, and perhaps with settling or dust, as heretofore defined.

Described in U.S. Pat. No. 3,849,395 is a process by which a calcium-sensitive carrageenan, specifically iota carrageenan, is rendered soluble in cold milk and exhibits sufficient protein reactivity to produce a stable system at a high use level (over 1500 ppm). By this process a potassium-sensitive kappa carrageenan retains its solubility but is so modified as to permit the attainment of an easily-spreadable jelly-like consistency in water.

Basically, the process of U.S. Pat. No. 3,849,395 involves the steps of (a) subjecting the hydrocolloid to treatment in an aqueous medium at elevated temperature in the presence of alkali, as described in U.S. Pat. No. 3,094,517, that increases the ratio of 3,6-anhydrogalactose groups to galactose groups so as to be at least 0.8 to 1, and (b) subjecting the hydrocolloid to degradative hydrolysis which decreases the viscosity at 75° C. of a 1.5% water solution of such hydrocolloid to between 0.4 to 4 centipoises (mPa.s). For example, the viscosity of a modified kappa carrageenan is reduced preferably so as to be from 0.6 to about 2.0 centipoises at 75° C. at a 1.5% concentration in water.

Commercial exploitation of the process of U.S. Pat. No. 3,849,395 is not possible, however, in view of the carrageenan viscosity restriction imposed in the *Food Chemicals Codex*, Second Edition (F.C.C. II), 1972, National Academy of Sciences, Washington, D.C. More specifically, the Third Supplement to F.C.C. II, dated 1978, specifies that the viscosity of a 1.5% concentration of carrageenan in water must not be less than 5 centipoises (5 mPa.s) at 75° C. As 1.5% water solutions of the modified carrageenans provided by the process of U.S. Pat. No. 3,849,395 have a viscosity of from 0.4 to 4.0 centipoises (0.4 to 4.0 mPa.s) at 75° C., the carrageenans resulting from such patented process are clearly unsuited for use in foods.

In carrying out the process of U.S. Pat. No. 3,094,517, the product obtained is often referred to as calcium carrageenan, since normally the calcium ion content predominates over either the sodium or potassium ions which may be present, though not necessarily the sum thereof, on a milliequivalent basis. However, one is not limited to the process disclosed in U.S. Pat. No. 3,094,517 in providing carrageenans which are suitable for use in the present invention, as other alkaline treatments may be applied to provide *Eucheuma cottonii* carrageenans in which cations other than calcium predominate.

Japanese Patent Disclosure Documents 107990/1978 and 117045/1979, based upon Japanese patent applications 19618/1977 and 24793/1978, respectively, are illustrative of known procedures by which carrageenans are isolated within seaweed particulates. Described in these documents are methods in which a seaweed species, such as *Eucheuma serra* or *Eucheuma gigas*, is treated with a hot solution of potassium hydroxide to provide a coagulating agent which is useful as a replacement for agar in artificial silkworm feed (Disclosure Document 107990/78), or a hot solution containing a mixture of potassium carbonate and sodium hydroxide to provide a coagulating agent for use in foods (Diclosure Document 117045/79). Products of this nature are commercially available, generally referred to as "KOH-treated seaweed" or "chemically-treated *cottonii*", and are typical of *Eucheuma cottonii* extracts which are suitable for use in the present invention.

Accordingly, a primary object of this invention is the provision of an improved extractive of *Eucheuma cottonii* seaweed for use as a stabilizer agent in milk-containing products.

A more specific object of this invention is the provision of a modified extractive of *Eucheuma cottonii* seaweed for use in suspending cocoa and carob pod powder in milk, and the resulting stabilized milk product.

A further object of this invention is the provision of a modified extractive of *Eucheuma cottonii* seaweed, which may be used to produce a double strength chocolate milk that can be diluted with an equal amount of white milk to prepare a satisfactory single-strength milk.

A still further object is the provision of a chocolate milk stabilizer having improved spread, such stabilizer consisting of carrageenan extracted from *Eucheuma cottonii* seaweed and having a controlled molecular weight.

These and related objects are achieved in accordance with this invention by an extractive of *Eucheuma cottonii* seaweed having a molecular weight reduced to within a controlled narrow range. It is known that intrinsic viscosity of carrageenan increases with molecular weight and that a relationship exists between molecular weight and normal water viscosity. There is also a satisfactory relationship between water viscosity of a carrageenan and its performance in chocolate milk.

Thus, based upon a 1.5% concentration at 75° C., the normal viscosity of the modified *Eucheuma cottonii* extractive of this invention is preferably within the range of from not less than about 5 mPa.s to about 20 mPa.s. It will be understood, and as heretofore mentioned, the terms "extractive", "extract" and "extracted" used alone or together with hydrocolloid or carrageenan are interchangeable when making reference to the stabilizer of the present invention.

Normally, end-use applications are best served with carrageenans having as high a molecular weight as possible, and thus the modified *Eucheuma cottonii* carrageenan extractive of this invention, having a reduced molecular weight, is one which would generally not be expected to serve so admirably as a stabilizing agent for milk products. The ability of carrageenan from other seaweeds, such as *Chondrus crispus,* to function as a stabilizer in chocolate milk is greatly impaired as the molecular weight of such carrageenan is reduced, either by a diminution of its range of effectiveness; that is, spread, or by a need for an increased use level; that is, higher milk index.

While it is certainly unexpected that the lowered molecular weight of the modified *Eucheuma cottonii* carrageenan extractive of this invention functions well in suspending cocoa in chocolate milk, perhaps more surprising is that the performance of this modified extractive as a stabilizing agent exceeds that provided by carrageenan from *Chondrus crispus.* One such performance advantage of the modified *Eucheuma cottonii* extractive of this invention is its ability to provide stabilization of chocolate milk at relatively high use levels without excessive thickening of the product, such as results when conventional carrageenan stabilizers are employed. This characteristic of the modified extractive of this invention is of particular importance in those circumstances where the chocolate milk is subjected to extreme shear stresses during processing, and the dairyman wishes to provide stabilization without running the risk of gelation, as is encountered when using a more conventional stabilizer at a high enough level to accommodate for the effects of shear stresses.

More specifically, a common shortcoming of Chondrus and Gigartina-based chocolate milk stabilizers is their failure to recover following processes involving high rates of shear, such as pumping or homogenization. The primary structure of stabilized chocolate milks is that of a broken gel. The gel forms during the cooling process as a result of the interaction between carrageenan and milk protein and as a result of carrageenan-carrageenan reactions akin to the formation of a water gel. Cocoa or carob pod powder is supported from settling down through this broken gel primarily as a result of its physical structure. Having a broken gel structure, then, the chocolate milk exhibits certain rheological properties characteristic of such discontinuous systems as, for example, ketchup and latex paint.

The property of thixotropy, or shear-thinning is very familiar here, as the material appears more viscous when subjected to low shear rates, and more fluid when agitated. The recovery rate is normally fairly rapid, and flow continues only briefly after the shear stress is removed. In general, the viscosity of the fluid returns to its initial value. Such does not appear to be the case in stabilized chocolate milks as the viscosity regain of chocolate milk is slower than that of ketchup, and very much slower than that of latex paint. When chocolate milks are subjected to more shear than experienced in the test procedure, there is frequently an irreversible loss of viscosity. Such irreversible loss of viscosity occurs at high use levels of Chondrus carrageenans, whereas a build-up of viscosity occurs with the modified *Eucheuma cottonii* extractive of this invention.

The method employed in producing the novel modified extractive of this invention differs from that described specifically in U.S. Pat. No. 3,849,395 in that the hydrocolloid extractive undergoing treatment is that of *Eucheuma cottonii* and this extractive is subjected to a lesser degree of hydrolysis so as to decrease the viscosity at 75° C. of a 1.5% water solution of such extractive to not less than about 5 mPa.s nor greater than about 20 mPa.s. Viscosity values at 75° C. of a 1.5% water solution mentioned herein are determined by the test as described in the Third Supplement to F.C.C. II, heretofore cited, on the "as-is" carrageenan extractive specified. That is, a 1.5% concentration of the modified as-is *Eucheuma cottonii* carrageenan extractive of this invention, as well as the other carrageenans referred to herein, is roughly 1.15%-1.35% on a pure anhydrous gum basis. While the test there described specifies a Brookfield LV-type viscometer operated at a speed of 30 rpm, measurements were made with such viscometer operated at 12 rpm. For the low viscosity values obtained (<20 mPa.s), it is advantageous to employ the Brookfield UL (ultra low) adaptor, which gives a range of 0-50 mPa.s at a speed of 12 rpm, and a full scale deflection which is equivalent to 20 mPa.s at the specified speed of 30 rpm.

The steps involved in the preparation of the modified extractive of the present invention, include (a) providing the *Eucheuma cottonii* hydrocolloid extractive, as by treatment in an aqueous medium at elevated temperature in the presence of alkali in a manner and for purposes as described in U.S. Pat. No. 3,094,517, and (b) hydrolysis which decreases the viscosity of a 1.5% water solution of such hydrocolloid extractive at 75° C. to within the range of from about 5-20 mPa.s. The reduction in molecular weight of the *Eucheuma cottonii* extractive may be achieved in any convenient manner, and has been attained successfully with acids, such as acetic and hydrochloric, as well as with oxidizing agents, such as hydrogen peroxide and ammonium persulfate.

To provide the modified *Eucheuma cottonii* hydrocolloid extractive of this invention, it is essential that the two treatment steps (a) and (b) be employed and, with the exception of the control exercised over the reduction of molecular weight; that is, viscosity of from 5 to 20 mPa.s at 75° C. of a 1.5% water solution of the hydrocolloid, both of such steps are adequately described in the cited U.S. Pat. No. 3,849,395.

The enhancement of the *Eucheuma cottonii* hydrocolloid accomplished by step (a) of the treatment may be typically achieved using an aqueous medium at elevated temperatures in the presence of calcium hydroxide, although other alkaline materials may be used, such as, sodium carbonate, trisodium phosphate, sodium hydroxide, and potassium hydroxide. Alternatively, procedures as described in the cited Japanese Patent Disclosure Documents may be employed.

The particular alkaline material employed is significant as the viscosity of the final product is influenced by the cationic species of the *Eucheuma cottonii* extractive. More specifically, the viscosity of the calcium salt is about one-half that of the sodium or potassium salt, with the preferred viscosity range of a 1.5% water solution at 75° C. of the calcium salt being 5 to about 10 mPa.s and that of the sodium and potassium salt being from 10 to 20 mPa.s. However, single cationic forms of carrageenan are usually produced only as a result of extensive ion-exchange procedures and are not normall products of commerce. Rather, the latter contain mixtures of these three cations, plus magnesium, for example, with the principal cation (on a milliequivalent basis) being calcium in the lime process of U.S. Pat. No. 3,094,517, potassium in the case of the KOH-treated materials, and sodium when sodium hydroxide is the alkali used for extraction. As would be anticipated, such mixed salts have viscosities intermediate between the extremes and are within the scope of the present invention. Based on weight-average molecular weight as estimated from intrinsic viscosity, the desired molecular weight range corresponding to these viscosities is from about 125,000 to 175,000 daltons.

A characteristic feature of the product of this invention is its infrared spectrum in the region of 805 $cm^{-1}$. Kappa carrageenan from most sources, obtained by alkaline treatment of the seaweed and fractionation with potassium chloride solution has a weak to moderate absorption band in the region of 805 $cm^{-1}$, which is assigned to 3,6-anhydrogalactose-2-sulfate. The kappa carrageenan from *Eucheuma cottonii*, *Eucheuma striatum*, and *Hypnea musciformis* lacks a distinct peak at 805 $cm^{-1}$ since it is nearly totally devoid of the 2-sulfated 3,6-anhydrogalactose moiety. Infrared spectra of these kappa carrageenans have, at most, a shoulder, or very, very slight absorption peak at 805 $cm^{-1}$. This is also true of the products from *Furcellaria fastigiata* (furcellaran; Danish agar) and *Eucheuma gelatinae*, but these are distinguished by much lower intensity peaks at 845 $cm^{-1}$ than the carrageenans named above, or more directly by their ester sulfate content, which is only about half of that of kappa carrageenan.

The product of this invention was analyzed for its ester sulfate content by known methods, and additional analyses were carried out for inorganic salts, moisture, and nitrogen in order to relate the sulfate content to the gum on a 100% basis. The sulfate content value was found to be 22.6%, which is very close to the 23.2% $SO_4$ calculated for an ideal kappa carrageenan having as its repeat structure 1 mole of galactose-4-sulfate and one of 3,6-anhydrogalactose and the particular mixture of cations present. Similar analyses on other carrageenan products gave sulfate content values up to about 24.6%. Expressed on the basis of moles of ester sulfate/mole of hexose, the range is about 0.48–0.53, although values lying slightly outside this range may be encountered.

The product of this invention may be characterized as follows:
Ester sulfate content, on a pure, anhydrous gum basis = about 22 to about 25%.
Very minor amount of absorption at 805 $cm^{-1}$ in the infrared spectrum.
A viscosity measured at 1.5% nominal concentration* and at 75° C. of 5–10 mPa.s as the calcium salt, 10–20 mPa.s as the sodium or potassium salt, and within the range of 5–20 mPa.s as a mixture of calcium, sodium, and potassium salts. Since with mixed salts the divalent cations exert a dominant or stronger influence on the viscosity than the monovalent ions, the viscosity of such mixed salts generally runs at the lower end of this range. For example, a mixed salt having 60% of its cations as calcium (on a milliequivalent basis) is ideally suited for cocoa suspension with a viscosity of 7–8 mPa.s.

*1.5% concentration of the as-is material is roughly 1.15%–1.35% on a pure, anhydrous gum basis. A typical alcohol-precipitated product would contain 80–85% anhydrous gum (1.24%), whereas a drum-dried one might be closer to 60–65%. A 2% as-is concentration would be more fitting to use in the latter case (equivalent to 1.25% anhydrous gum).

While particular reference has been made to the use of the modified *Eucheuma cottonii* carrageenan extractive as a stabilizer of chocolate milk, its applications are not limited to the suspension of cocoa (or carob pod powder) in milk, but rather, it appears to be an efficient replacement for the more expensive *Chondrus crispus* carrageenan in other milk applications, such as the prevention of whey formation and separation in ice cream and ice milk mixes.

Examples hereafter set forth further illustrate the merits of the present invention. Viscosities set forth in these examples were determined in accordance with the test procedure set forth in the Third Supplement to F.C.C. II heretofore cited. The milk index test is specific to the industry and is performed as follows:

Prepare a mixture consisting of 82.5 parts of granulated sugar and 17.5 parts of cocoa.

Prepare approximately 2% butterfat milk by mixing equal volumes of whole milk and fat-free milk.

Weigh out 53.9 g of the sugar-cocoa premix and intimately blend into it the carrageenan or extractive to be tested. For a control sample, carrageenan having a milk index (MI) of 250 ppm (parts per million) is generally used. This corresponds to 0.167 g for the size run of the test being described.

Weigh out 670 g of the 2% butterfat milk into a 1-liter stainless steel beaker tared with agitator and thermometer. Attach the agitator to the chuck of a stirring motor and start agitation of the milk. Disperse the sugar, cocoa, carrageenan or extractive mixture into the vortex created. Add 25 mL of distilled water and heat the beaker and contents in a water bath at 77° C. until the milk reaches a temperature of 71° C. Remove the beaker from the bath and replace the water lost by evaporation (net weight = 670 + 54 + 25 = 749 g).

Cool the milk to 10° C. by running it down a surface cooler (or, alternatively, by immersing the beaker in an ice/water bath and stirring gently). Pour the chilled milk into a pint milk bottle, cap the bottle, and place it in a 10° C. water bath, for overnight storage.

The next day, remove the bottle from the bath and observe the milk for appearance both in the bottle, and on pouring it into a 400-mL Berzelius beaker containing a Zahn viscometer (with 2.26 mm [0.089"] diameter [No. 43 drill] orifice). The beaker and viscometer should be prechilled to 10° C.

Measure the time necessary for the milk to drain completely from the full viscometer cup through the orifice. The cup is filled by being immersed in the milk and the stopwatch should be started just at the instant the top of the cup breaks through the surface of the milk as it is lifted smoothly at a moderate speed to a height that will leave the tip clear of the milk in the beaker after the cup has drained. The cup is suspended from a ring-stand clamp or other horizontal support as it drains. The endpoint for drainage is the instant at which the orifice becomes visible when viewed from above. The watch is stopped at this point and the flow time noted.

Although the flow time of a standard will vary from day to day, and especially from season to season, a typical value will be in the range of 32-35 sec. In order to determine the milk index of a sample being tested, it is necessary to prepare milks at a minimum of two concentrations, which ideally should bracket the expected value. The value can then be determined graphically using semi-log paper, with the flow times plotted on the logarithmic axis and the use level on the linear scale. A line drawn between the points will indicate the milk index at the point where it crosses the flow time of the control sample.

In most respects, this test simulates the procedures used in the commercial preparation of bottled chocolate milk. That is to say, the entire batch is subjected to a pasteurization step, even though, in many cases, the white milk being used has already been pasteurized. It would be a substantial savings in energy costs to the dairies if this heating and cooling step could, in any manner, be diminished. Toward this end, attempts have been made to prepare somewhat more concentrated chocolate milks and dilute them to single strength with cold, previously pasteurized white milk. Poor stability generally results, with some settling of the cocoa. To compensate for this, the use level of the carrageenan or extractive may be increased, but only partial success is achieved due to the tendency for gelation. As a result, a mix of 2 chocolate and 1 white in the cold blend is considered a major achievement even though there may be some shortcomings in the appearance of the final milk on storage.

Unexpectedly, it has now been found that the product of this invention has unique stabilizing properties, in that it may be used to prepare double strength chocolate milk which may be mixed with an equal amount of white milk to produce a single strength chocolate milk of acceptable quality.

Temperatures referred to in the examples are in °Celsius, and unless otherwise indicated, the terminology employed in the examples, particularly as to observations or results, and certain abbreviations have been previously defined. Other abbreviations used are defined, as follows:

sec. - second
min. - minutes
h. - hour
homo'n - homogenization
homog'd - homogenized
hrs. - hours
sl. - slight
v.sl. - very slight
sep'n - separation
lt. - light
hvy. - heavy
o.k. - satisfactory
Vis. - viscosity

EXAMPLE 1

Carrageenan was separated from *Chondrus crispus* (*C. crispus*) and from *Eucheuma cottonii* (*E. cottonii*) by the method of U.S. Pat. No. 3,094,517, at a temperature of about 90°-95°, and a lime level of about 20% of the weight of the seaweed. A mineral filter-aid was incorporated into the paste after about 30 hours' heating, and the insolubles were removed by filtration. The resulting filtrate was treated with hydrochloric acid to lower the pH to about 8.5, and was then mixed with isopropyl alcohol to cause coagulation (precipitation) of the carrageenan. This was separated on a screen, washed with fresh 80% aqueous isopropyl alcohol, squeezed as dry as possible and dried at about 60°. The dry fibrous product was ground finer than 40-mesh and tested for water viscosity (1.5% in distilled water, 75°, with a Brookfield LV-type viscometer, No. 1 spindle at 12 rpm) and milk index.

The viscosity and chocolate milk properties of the carrageenans prepared from *C. crispus* and *E. cottonii* were as set forth in Table I.

From Table I, it can be seen that the *E. cottonii* carrageenan is decidedly inferior to that which is obtained from *C. crispus* by the same method, insofar as stabilizing chocolate milk is concerned, even when its quality appears to be equivalent, as evidenced by viscosity, which is a measure of molecular weight. When the *C. crispus* sample was run, the control had a 34.0-sec. flow time; for the *E. cottonii* sample, it was 32.0. Using the graphical method, the milk indexes of the two materials were determined to be 177 and approximately 357, respectively.

EXAMPLE 2

Illustrated by this example is the effect of molecular weight reduction on the behavior of carrageenan from *E. cottonii*.

Forty-eight grams of the *E. cottonii* carrageenan from Example 1 was dissolved in distilled water to make 3200 g of 1.5% solution after heating. The temperature was adjusted to 75°, and 10 mL of 5% hydrogen peroxide was added. The viscosity of the solution was monitored, and when it had been reduced by approximately half, an additional 5 mL of 5% $H_2O_2$ was added. A 600-mL aliquot was withdrawn at a viscosity equal to one-third of the original value, and 14 mL of 5% sodium sulfite was added to the aliquot to destroy any remaining peroxide. The aliquot was mixed with isopropyl alcohol to effect coagulation of the carrageenan. This product was designated as sample A.

An additional 5 mL of 5% $H_2O_2$ was added to the remaining solution and when its viscosity had been reduced from 24 to 18.3 mPa.s, another 600-mL aliquot was removed and treated as the first one and was designated sample B. A third 600-mL aliquot was similarly worked up after the addition of 21 mL more of the 5% $H_2O_2$ and designated as sample C, and the remaining portion after the still further addition of 5% $H_2O_2$ (21 mL) was designated as sample D.

The four coagula thus prepared were screened from the alcohol, washed with fresh 80% aqueous isopropyl alcohol, pressed out, dried, and ground through a 40-mesh screen in a laboratory sample mill. They were then tested for viscosity and ability to suspend cocoa in milk, and the milk index of each of the five products was calculated as previously described. The results are presented in Table II.

From the results obtained it can be seen that as the viscosity of the carrageenan was lowered, its performance improved, i.e., less was required to produce satisfactory cocoa suspension in milk.

EXAMPLE 3

This example illustrates that the manner of lowering the viscosity of the carrageenan is not critical to the success of the resulting product in chocolate milk stabilization.

*E. cottonii* seaweed was treated in the presence of 25% lime based on the weight of seaweed used and after 43 hours at 90°–95°, the mixture was treated with potassium persulfate in the ratio of 750 g of paste and 0.09 g $K_2S_2O_8$. After 30 min. additional stirring, filter aid was added and the insolubles removed. The filtrate was neutralized to pH 8.5–9.0 and admixed with isopropyl alcohol. The product, designated as sample A in Table III, was tested for viscosity and milk index.

Another portion of *E. cottonii* seaweed was treated for 23 hrs. with 20% lime based on the weight of the weed, then filtered. Dilute hydrochloric acid was added to a pH of 2.85 (at 75°) which was held for 6 min. before adding sodium hydroxide solution to a pH of 8.95. The carrageenan was precipitated by alcohol addition as above and tested and is designated as sample B.

Lime-extracted carrageenan from *E. cottonii*, which had received a treatment with $H_2O_2$ prior to filtration, and which had a viscosity of 68 mPa.s at 1.5% and 75°, was dissolved in hot water at a concentration of 1.5%. To 3000 g of the solution at 75°, was added 30 mL of 1 N acetic acid to provide a pH of 4.2. The 75° temperature was maintained for 6 hours, at which time, aqueous sodium hydroxide was added to raise the pH to 8.8. The carrageenan was recovered by alcohol coagulation in the usual manner and was designated as sample C.

Another portion of the carrageenan used to prepare sample C was treated with $H_2O_2$ at its natural pH and recovered by alcohol precipitation in the usual manner and designated as sample D.

The results obtained are set forth in Table III and, because the samples were prepared and tested at different times, the control milks' viscosities are indicated for each one.

EXAMPLE 4

One of the principal reasons that *E. cottonii* extractive has not been used in the past as a chocolate milk stabilizer is the characteristic fault of top separation which occurs with *E. cottonii* extractives so used. Thus, the amount of top separation which occurs at the milk viscosity which matches the control is an excellent indication of the improvement which may be realized by application of the present invention. A number of *E. cottonii* extractives were prepared, and their viscosities reduced as described in the preceding examples. In Table IV, the relationship between water viscosity of the extractive and amount of top separation at the milk viscosity of the control milk is indicated.

EXAMPLE 5

That reduction of viscosity in carrageenan is not normally advantageous was demonstrated by fractionating the *Chondrus crispus* carrageenan from Example 1 into its kappa and lambda components, and then preparing a series of products by controlled reduction of viscosity of the kappa fraction. The results are presented in Table V. As the viscosity is reduced, the milk index increases; that is, more carrageenan is required to prepare a satisfactory chocolate milk. At the same time, the spread decreases, meaning that a user has less leeway in the amount he may use to prepare a satisfactory milk. In fact, by the time the viscosity has been lowered to 12 mPa.s, there is virtually no spread at all—with dust at 200 ppm and blurp at 240 ppm.

The fractionation was carried out by stirring 20 g of the carrageenan with two liters of 2.5% KCl solution at room temperature for an hour followed by overnight standing of the mixture. The following day, 100 g of fine diatomaceous earth filter aid (Special Speed Flow, Dicalite Corp.) was stirred in for 10 min. The mixture was filtered and the kappa fraction additionally purified by stirring the filter cake containing it with one liter of 2.5% KCl for an hour to further leach out lambda carrageenan. The mixture was filtered and the kappa carrageenan recovered from the filter cake by heating the cake in one liter of distilled water at 90° for 10 min. The mixture was filtered and the filtrate added to 2.5 volumes of 85% isopropyl alcohol. The kappa carrageenan thus precipitated was washed with one volume of 80% isopropyl alcohol, pressed out, dried and ground to pass a 40-mesh screen. It was then tested and treated to give the sub-samples presented in Table V.

As the samples were prepared and tested at different times, the viscosities of the control milks are also indicated in Table V.

EXAMPLE 6

To demonstrate the unexpected opposite effect which lowering the viscosity of *Eucheuma cottonii* kappa carrageenan has, several products were prepared by the methods described in Example 3, and their water viscosities and milk properties tested. In this case, the functionality of the carrageenan increased as the viscosity decreased, most markedly at the point where the *Chondrus crispus* kappa carrageenan failed, i.e., about 10–15 mPa.s. The best properties became evident between 5 and 10 mPa.s. The trend quickly reversed itself and behavior similar to that of *Chondrus* kappa carrageenan occurred as the viscosity of the extractive fell below 5 mPa.s. This is illustrated by the data in Table VI.

EXAMPLE 7

The effect of the cation associated with the carrageenan is virtually nonexistent with respect to the behavior of the carrageenan in the milk, since the use level is so low. The contribution of calcium from the milk is 10–100 times as great as that from the carrageenan, and the potassium in the cocoa is approximately 10 times that in the carrageenan. However, in defining the product of this invention by its water viscosity, a peculiar feature of carrageenan extractive must be kept in mind: the calcium salt of kappa carrageenan extractive has approximately half the viscosity of the sodium or potassium salt, measured as described above. Thus, while the preferred embodiment of the invention defines a kappa carrageenan extractive having a 1.5% viscosity measured at 75° with a Brookfield LV-type viscometer of 5–10 mPa.s, this refers to the predominantly calcium salt. If the calcium is removed by sequestration and ion-exchange, and is replaced by sodium or potassium, or if the sodium or potassium salt is prepared directly, its viscosity will be in the range of 10–20 mPa.s. Mixed salts will have viscosities which are intermediate within these ranges, depending upon the cation balance. The following will indicate the equivalency of monocationic salts at their respective viscosities.

Carrageenan prepared from *E. cottonii* by the method of U.S. Pat. No. 3,094,517, was treated with hydrogen peroxide as described in preceding examples, and isolated from solution by alcohol precipitation. It was found to have a viscosity of 7.9 mPa.s by the procedure given above. Ten grams of this product was agitated in two liters of a solution composed of 10 g of tetrasodium ethylenediaminetetracetic acid (Na4 EDTA) in 60% isopropyl alcohol (IPA), for 2 h, then separated by filtration and washed three times with fresh alcohol and dried. It had a viscosity of 17.4 mPa.s. Another 10-g portion was washed in two 500-mL portions of 0.5% Na4 EDTA in 60% IPA, for an hour each, to remove $Ca^{++}$, then was washed with the following series of solutions to effect ionic exchange and remove excess salts:

A 500 mL 1 N KCl in 50% by volume IPA
B 500 mL 1 N KCl in 50% by volume IPA
C 500 mL 1 N KCl in 50% by volume IPA
D 500 mL 75% IPA
E 500 mL 80% IPA After a final filtration and drying, the potassium salt thus prepared was tested for its viscosity, which was found to be 14.2 mPa.s.

To demonstrate their equivalency in chocolate milk despite their now different viscosities, milks were prepared as described above. The results are given in Table VII.

EXAMPLE 8

The effect of the cations on viscosity was also demonstrated on a sample which had too high a viscosity to function satisfactorily in chocolate milk. A large quantity of lime-processed *E. cottonii* carrageenan was washed free of $Ca^{++}$ with Na4 EDTA-alcohol as in the preceding example. Portions of this material were then given the extensive series of washes as in that example, substituting NaCl for KCl in one case, and $CaCl_2$ for KCl in another. The cation analyses and viscosities of 1.5% water solutions at 75° C are given in Table VIII.

EXAMPLE 9

KOH-treated *Eucheuma cottonii* extractive was added to water near the boiling point to a concentration of 4%. The temperature was maintained at about 85–95° C., for a period of about one hour, by which time, it was judged that the carrageenan extractive was dissolved. Mechanical agitation was provided throughout the process. Ammonium persulfate was added to the paste as an aqueous solution until it was ascertained by reconstitution of a dried aliquot under conditions described below, that a viscosity of 7.5 mPa.s had been reached. At that stage, the remaining solution was roll-dried, using steam-heated rolls, such as are commonly employed by the industry. Chocolate milk was made with this material, as described above. Satisfactory suspension of cocoa was obtained at a use level of 300 ppm of the modified extractive, yet no blurp or ripple was seen when a use level of 600 ppm was employed, again demonstrating the wide spread of the product of this invention.

In order to obtain a more accurate measure of the viscosity of the above product, the following procedure was devised. A 1.8% solution of the roll-dried product was prepared and then centrifuged. The viscosity measurement was then made on the centrifugate, in the manner described elsewhere herein, that is, at 75° C., using the UL adapter on the Brookfield LV-type viscometer at a speed of 12 rpm. The equivalency of this method to that employed with filtered extractives was demonstrated by admixture of a known weight of the viscosity test solution with twice its volume of 85% isopropyl alcohol to recover the carrageenan extractive, which was then dried thoroughly and weighed. Its concentration was found to lie within the 1.15–1.35% range noted elsewhere as being typical for a nominal 1.5% solution of a usual carrageenan of commerce. Thus, the measurement is on a comparable basis to that made on a filtered extract.

Chemical analysis of a typical product made in the above-described manner showed the following distribution of cations on a milliequivalent basis:

| | |
|---|---|
| $Na^+$ | 6.1% |
| $K^+$ | 42.4% |
| $Ca^{++}$ | 29.9% |
| $Mg^{++}$ | 21.6% |

Thus, while the treatment process might be expected to yield a product containing almost exclusively potassium with respect to cations, and, therefore, one which would have a viscosity in the 10–20 mPa.s range, it is seen that divalent cations remain at a significant level, and exert a strong effect on the viscosity. Indeed, in this instance, the divalent cations are essentially in the same ratio to monovalent cations that they are in a typical lime-processed, filtered carrageenan, either alcohol precipitated, or roll-dried. Table IX clearly explains the similarity of the aqueous solution viscosities of the milk-functional products regardless of their method of preparation in the above instance.

It will be obvious to one skilled in the art that treatment of either the starting seaweed, the intermediate alkali treated product, or the finished product described above, by ion-exchange techniques such as salt washes, sequestration, or precipitation reactions, may alter this ion balance and, as described herein, the aqueous viscosity of the final product will vary, but the product's effectiveness in preparing chocolate milk will be unchanged.

EXAMPLE 10

While the prevention of whey formation and separation in ice cream and ice milk mixes is a task generally assigned to the Chondrus-type carrageenan, such as that prepared in Example 1, this example illustrates the effectiveness of the material of the present invention in these applications.

A number of carrageenans made from *E. cottonii* were tested in the whey separation test described below. These carrageenans were prepared as described in preceding examples, so that the critical difference among them was the molecular weight of the modified carrageenan, as related to the viscosity of a 1.5% water solution thereof at 75°.

In the whey-off test, a mixture containing milk solids non-fat (MSNF), sugar, carboxymethylcellulose (CMC), water, and carrageenan is allowed to stand for a period of time, then is observed for whey separation, remixed and again observed for whey separation after an additional period of standing, such as six days.

Because the amount of carrageenan used in the test is so small, it is advantageous to prepare a mixture consisting of one gram of carrageenan and 19 g of sugar and to weigh portions of this 5% carrageenan blend for the individual use-level tests.

It is also convenient to prepare a stock solution of the CMC as follows: Disperse 3.3 g of CMC having a degree of substitution of about 70% and a high viscosity, such as the kind designated 7H3SXF, manufactured by Hercules, Inc., into 500 g distilled water, then heat until completely dissolved. Dilute the hot solution to 1000 g and cool to 25° for use as needed.

To prepare the formulation for testing, weigh out 32.37 g of MSNF, 43.62 g of sugar and blend with 0.60 g of the 5% carrageenan mixture for a 120-ppm level test, or with 0.40 g for an 80-ppm test. Dilute 105.25 g of the CMC solution with 68.75 g distilled water and disperse into it, with mechanical agitation, the MSNF, sugar, carrageenan mixture. Pasteurize the mixture at 74.5° for 20 min. Adjust the weight loss with distilled water, to a total net weight of 250 g.

Cool the mixture down to 10° C. by stirring in an ice bath. Transfer the contents to a 300-mL Berzelius beaker and store, tightly covered, overnight at 10°.

The next day, observe for curdling and whey separation, then pour the liquid back and forth into a second beaker 6 times to remix completely. Cover the beaker tightly and store, undisturbed, for 6 days. Measure whey layer again. Express whey-off as a percent of the total height.

As can be seen from the results in Table X, this test is designed in such a way that even a control will usually give some whey-off. This is an advantage from the standpoint that there is a greater degree of differentiation among test samples. The performance of the *E. cottonii* carrageenans was, in general, superior to that of the control, a Chondrus/Gigartina-based product. However, the trend toward better performance of the modified *E. cottonii* extractives of lower viscosity of the present invention is evident in Table X.

EXAMPLE 11

To demonstrate the effect of shear stress on viscosity, chocolate milks were prepared as described in preceding examples, using standard products of commerce prepared from mixed Chondrus and Gigartina species of red seaweeds, designated as Standard Product A and B, and from modified *E. cottonii* extractive prepared as defined above, at and above their milk indexes. The standard products had milk indexes of about 260 ppm; the product of this invention, with a viscosity of 6.7 mPa.s, had a milk index of 250. The milks were allowed to stand overnight, then were observed as usual, and their viscosities (flow times) determined. They were then subjected to a high shear stress by passing them through a hand-operated homogenizer, of the type illustrated in the 1980 VWR Scientific Inc., catalog, p. 646, item 33998-001, and were rebottled for a second night's storage at 10°. The observations were made again, and the viscosities again determined. The rationale for this test was to investigate the effects of the common practice of using stabilizers above their milk indexes to overcome the effects of high shear. Frequent problems arising from this procedure are blurp and destabilization. As seen from the information given in Table XI, the *E. cottonii* product of this invention demonstrated greatly superior properties in this test, showing a great advantage over conventional stabilizers.

The gain in viscosity encountered only with the new product of this invention is highly advantageous from the standpoint that it represents an increase in stabilization, whereas the lower viscosity with the standard products represents a destabilization. A further advantage of the new product is resistance to overstabilization, i.e., blurp, at the higher use levels.

EXAMPLE 12

As has been indicated, the property known as spread is one which is highly desirable, since it permits the user a greater range over which he may prepare satisfactory milks. In Example 11, the top of the range was not reached, even at 500 ppm. The series was continued up to 1000 ppm. Slight blurp was reached at 700 ppm, but quite surprisingly, even at 1000 ppm, the milks were not observed to exhibit heavy blurp. The homogenizing of the milks after the initial reading was carried out at these higher levels also, and at the concentration where blurp was first observed, a reversal of the trend in viscosity occurred. That is, the milks lost viscosity following exposure to shear stress, as did their Chondrus counterparts.

Although it is highly unlikely that anyone would prepare a chocolate milk with a flow time in excess of 60 seconds, the main point illustrated by this example is that this novel modified *E. cottonii* extractive of this invention has a spread four times as great (500 vs. 120 ppm) as a conventional Chondrus or Gigartina carrageenan. The greater versatility of the product of this invention is further illustrated by its behavior after homogenization of the milk. If one can conclude that the use level at which the direction of viscosity change reverses itself represents a maximum practical level, then its versatility is even greater, since the standard products are already negative at their milk indexes, and this material may be used at up to twice its milk index before this occurs. The complete range is indicated in Table XII.

EXAMPLE 13

The advantage of the new carrageenan extractive stabilizer of this invention in preparing double-strength chocolate milk for later diluting to single-strength chocolate milk is illustrated by this example. Employed in this example was the *E. cottonii* product used in Examples 11 and 12. Also a conventional stabilizer, designated as Standard Product B in Example 11, was tested at the same time, as a means of comparison with the new product.

Dry blends of cocoa, sugar and carrageenan extractive were prepared as described above, for extractive levels corresponding to 250, 300, 350, and 400 ppm in the final milk, but for the pasteurization step, two such respective blends were added to the normal (single) quantity of milk and water. After the milk came off the cooler, it was mixed with an additional 570 g white milk (2% fat) + 25 g water, and divided into two portions. One was bottled directly, and the other was subjected to a homogenization step, using the hand homogenizer described in Example 11, and then bottled. The following day, the milks were observed, and their flow times determined in the usual manner. The superiority of the modified carrageenan extractive of this invention was clearly evident, as is shown in Table XIII. Homogenization (or other severe mixing) was necessary in creating this advantage, but it did not render the milk prepared with the conventional stabilizer satisfactory.

TABLE I

| Seaweed | Viscosity (mPa.s) | Use Level (ppm) | Observations on the Milk | Flow Time (sec) |
|---|---|---|---|---|
| C. crispus | 80 | 85 | 75 mm separation; light settling | 25.0 |
| | | 115 | light settling | 28.0 |
| | | 145 | dust | 31.0 |
| | | 175 | OK | 33.5 |
| | | 205 | OK | 38.5 |
| | | 235 | OK | 45.5 |
| | | 265 | slight blurp | 51.0 |
| | | 295 | blurp | 61.5 |
| E. cottonii | 72 | 200 | 65 mm separation, light settling | 26.0 |
| | | 230 | 50 mm separation, dust | 26.5 |
| | | 260 | 50 mm separation, dust | 28.0 |
| | | 290 | 40 mm separation, dust | 29.0 |
| | | 320 | 40 mm separation, dust | 30.0 |
| | | 350 | 40 mm separation, dust | 31.5 |
| | | 380 | 40 mm separation, dust | 34.0 |
| | | 410 | 40 mm separation, dust | 35.5 |

TABLE II

| Sample | 1.5% Vis. (mPa.s) | Use Level (ppm) | Observations | Flow Time (sec) | MI |
|---|---|---|---|---|---|
| Control | — | 250 | OK | 34.0 | 250 |
| Parent | 72 | | as in Example 1 | | 357 |
| A | 20 | 240 | Sl. sep'n., lt. dust | 31.5 | 278 |
| | | 320 | OK | 37.0 | |
| B | 10 | 240 | V. sl. sep'n. | 33.5 | 248 |
| | | 320 | OK | 39.0 | |
| C | 8.4 | 240 | OK | 35.0 | 225 |
| | | 320 | OK | 41.0 | |
| D | 7.4 | 240 | OK | 36.0 | 214 |
| | | 320 | OK | 43.0 | |

TABLE III

| Sample | 1.5% Vis. (mPa.s) | Use Level (ppm) | Observations | Flow Time (sec) | MI |
|---|---|---|---|---|---|
| Control A | 6.8 | 250 | OK | 33.25 | 232 |
| | | 240 | V. sl. sep'n. | 33.5 | |
| | | 320 | OK | 38.5 | |
| Control B | 6.1 | 250 | OK | 33.0 | 203 |
| | | 240 | OK | 37.5 | |
| | | 320 | OK | 46.5 | |
| Control C | 8.5 | 250 | OK | 31.75 | 200 |
| | | 240 | V. sl. sep'n. | 35.0 | |
| | | 320 | V. sl. sep'n. | 41.5 | |
| Control D | 8.8 | 250 | OK | 32.0 | 197 |
| | | 240 | OK | 35.0 | |
| | | 320 | OK | 41.5 | |

TABLE IV

| Sample | Vis (mPa.s) | mm sep'n. at control viscosity |
|---|---|---|
| A | 83 | 19 |
| B | 72 | 40 |
| C | 66 | 25 |
| D | 49 | 25 |
| E | 38.3 | 27 |
| F | 37 | 8 |
| G | 27.5 | 35 |
| H | 26 | 7 |
| I | 25.3 | 17 |
| J | 16.8 | 12 |
| K | 16.5 | 9 |
| L | 14 | 6 |
| M | 13.3 | 9 |
| N | 12.5 | 8 |
| O | 12.5 | 4 |
| P | 12 | 5 |
| Q | 12 | 6 |
| R | 11.2 | 4 |
| S | 11 | 6 |
| T | 11 | 0 |
| U | 10.8 | 3 |
| V | 10.3 | 1 |
| W | 10 | 3 |
| X | 10.0 | 2 |
| Y | 9.8 | 2 |
| Z | 9.5 | 2 |
| A-A | 9.3 | 4 |
| B-B | 9.3 | 3 |
| C-C | 9.25 | 0 |
| D-D | 8.3 | 4 |
| E-E | 8.3 | 4 |
| F-F | 7.9 | 3 |
| G-G | 7.9 | 0 |
| H-H | 7.4 | 0 |
| I-I | 7.1 | 0 |
| J-J | 6.9 | 1 |
| K-K | 6.8 | 1 |
| L-L | 6.8 | 1 |

TABLE V

| Sample | Vis. | ppm | Observation | Time | MI | Spread* |
|---|---|---|---|---|---|---|
| Control | 167 | 250 | OK | 34.0 | 143 | 120 |
| A | | 80 | V. sl. top sep'n.; settling | 28.0 | | |
| | | 110 | dust | 30.0 | | |
| | | 140 | OK | 33.5 | | |
| | | 170 | OK | 39.0 | | |
| | | 200 | OK | 45.5 | | |
| | | 230 | sl. blurp | 53.5 | | |
| Control B | 44.5 | 250 | OK | 35.0 | 140 | 100 |
| | | 70 | settled out | 26.5 | | |
| | | 100 | dust | 29.5 | | |
| | | 130 | OK | 33.0 | | |
| | | 160 | OK | 38.5 | | |
| | | 200 | sl. blurp | 48.0 | | |
| Control C | 26.5 | 250 | OK | 35.0 | 145 | 85 |
| | | 70 | settled out | 26.0 | | |
| | | 100 | settling | 28.5 | | |
| | | 130 | OK | 32.5 | | |
| | | 160 | OK | 37.5 | | |
| | | 200 | sl. blurp | 47.5 | | |
| Control D | 25.5 | 250 | OK | 35.0 | 152 | 70 |
| | | 70 | settled out | 25.5 | | |
| | | 100 | heavy settling | 28.0 | | |
| | | 130 | lt. dust | 32.0 | | |
| | | 160 | OK | 36.5 | | |
| | | 200 | sl. blurp | 46.5 | | |
| Control E | 12.0 | 250 | OK | 35.0 | 184 | <40 |
| | | 70 | settled out | 24.0 | | |
| | | 100 | settled out | 25.0 | | |
| | | 130 | heavy settling | 28.0 | | |
| | | 160 | lt. settling | 31.5 | | |
| | | 200 | dust | 37.0 | | |
| | | 240 | blurp | 47.5 | | |
| Control F | 5.25 | 250 | OK | 35.0 | 244 | 0 |
| | | 70 | settled out | 23.5 | | |
| | | 100 | settled out | 23.5 | | |
| | | 130 | settled out | 24.0 | | |
| | | 160 | settled out | 25.5 | | |
| | | 200 | heavy settling | 29.5 | | |
| | | 240 | lt. settling | 33.0 | | |
| | | 320 | blurp | 44.0 | | |

*Spread is that concentration range over which the stabilizer provides a satisfactory chocolate milk; that is, one which exhibits dust to one having a slight blurp, inclusive.

TABLE VI

| Sample | Vis. | ppm | Observation | Time | MI | Spread* |
|---|---|---|---|---|---|---|
| Control A | 37 | 250 | OK | 32.0 | 284 | — |
| | | 200 | 20 mm sep'n., settling | 28.0 | | |
| | | 230 | 13 mm sep'n., settling | 29.5 | | |

TABLE VI-continued

| Sample | Vis. | ppm | Observation | Time | MI | Spread* |
|---|---|---|---|---|---|---|
|  |  | 260 | 13 mm sep'n., settling | 30.5 |  |  |
|  |  | 290 | 7 mm sep'n., settling | 32.5 |  |  |
|  |  | 320 | 1 mm sep'n., lt. settling | 34.0 |  |  |
|  |  | 350 | 1 mm sep'n., lt. settling | 35.0 |  |  |
|  |  | 380 | 1 mm sep'n., lt. settling | 36.5 |  |  |
|  |  | 410 | 1 mm sep'n., lt settling | 39.0 |  |  |
| Control B | 17.5 | 250 | OK | 32.0 | 290 | — |
|  |  | 200 | 25 mm sep'n., lt. settling | 28.5 |  |  |
|  |  | 230 | 13 mm sep'n., dust | 29.0 |  |  |
|  |  | 260 | 13 mm sep'n., dust | 30.5 |  |  |
|  |  | 290 | 7 mm sep'n., dust | 32.0 |  |  |
|  |  | 320 | 3 mm sep'n. | 33.5 |  |  |
|  |  | 350 | 1 mm sep'n. | 35.5 |  |  |
|  |  | 380 | 1 mm sep'n. | 39.0 |  |  |
|  |  | 410 | <1 mm sep'n. | 41.5 |  |  |
| Control C | 13.0 | 250 | OK | 33.5 | 255 | — |
|  |  | 220 | 1 mm sep'n. | 31.5 |  |  |
|  |  | 300 | 1 mm sep'n. | 36.0 |  |  |
| Control D | 13.0 | 250 | OK | 34.0 | 290 | >150 |
|  |  | 170 | 1 mm sep'n., dust | 29.5 |  |  |
|  |  | 200 | 1 mm sep'n., dust | 30.0 |  |  |
|  |  | 230 | 1 mm sep'n. | 31.0 |  |  |
|  |  | 260 | OK | 32.5 |  |  |
|  |  | 290 | OK | 34.0 |  |  |
|  |  | 320 | OK | 36.5 |  |  |
|  |  | 350 | OK | 38.0 |  |  |
|  |  | 380 | OK | 42.0 |  |  |
|  |  | 410 | OK | 44.0 |  |  |
| Control E | 6.1 | 250 | OK | 34.0 | 215 | >210 |
|  |  | 110 | 1 mm sep'n., hvy. settling | 26.5 |  |  |
|  |  | 140 | settling | 28.0 |  |  |
|  |  | 170 | dust | 30.0 |  |  |
|  |  | 200 | dust | 32.0 |  |  |
|  |  | 240 | OK | 37.5 |  |  |
|  |  | 320 | OK | 46.5 |  |  |
|  |  | 350 | OK | 48.5 |  |  |
|  |  | 380 | OK | 51.5 |  |  |
|  |  | 410 | OK | 57.0 |  |  |
| Control F | 6.2 | 250 | OK | 32.5 | 208 | >400 |
|  |  | 120 | settling, some sep'n. | 27.0 |  |  |
|  |  | 160 | lt. settling | 29.0 |  |  |
|  |  | 360 | OK | 46.0 |  |  |
|  |  | 420 | OK | 52.5 |  |  |
|  |  | 480 | OK | 63.0 |  |  |
|  |  | 520 | OK | 68.0 |  |  |
|  |  | 580 | OK | 81.5 |  |  |
| Control G | 5.3 | 250 | OK | 33.25 | 205 | 320 |
|  |  | 120 | 1 mm sep'n., settling | 27.5 |  |  |
|  |  | 160 | lt. settling | 29.0 |  |  |
|  |  | 360 | OK | 48.5 |  |  |
|  |  | 420 | OK | 56.5 |  |  |
|  |  | 480 | OK | 68.5 |  |  |
|  |  | 520 | V. sl. blurp | 75.0 |  |  |
|  |  | 580 | sl. blurp | 90.5 |  |  |
| Control H | 4.6 | 250 | OK | 33.25 | 210 | 0 |
|  |  | 80 | settled out | 25.5 |  |  |
|  |  | 120 | 70 mm sep'n., hvy. settling | 25.5 |  |  |
|  |  | 160 | settling | 29.0 |  |  |
|  |  | 200 | lt. settling | 32.0 |  |  |
|  |  | 240 | dust | 35.5 |  |  |
|  |  | 280 | V. sl. blurp | 40.5 |  |  |
| Control I | 3.1 | 250 | OK | 33.25 | 206 | 0 |
|  |  | 160 | sl. sep'n., hvy. settling | 28.5 |  |  |
|  |  | 200 | lt. settling | 31.5 |  |  |
|  |  | 240 | dust, sl. blurp | 35.5 |  |  |

*Spread as defined in Example V, inclusive.

TABLE VII

| Sample | Vis. | ppm | Observations | Time | MI |
|---|---|---|---|---|---|
| Control |  | 250 | OK | 33.75 |  |
| $Ca^{++}$ salt | 7.9 | 190 | OK | 31.5 |  |
|  |  | 240 | OK | 33.5 | 235 |
|  |  | 290 | OK | 37.5 |  |
| $Na^+$ salt | 17.4 | 240 | OK | 36.0 |  |
|  |  | 320 | OK | 43.0 | 211 |
| $K^+$ salt | 14.2 | 240 | 1 mm sep'n. | 35.5 |  |
|  |  | 320 | 1 mm sep'n. | 42.0 | 216 |

TABLE VIII

| Salt form | % Na | % K | % Ca | % Mg | Meq. % of predominant cation | Vis. (mPa.s) |
|---|---|---|---|---|---|---|
| Sodium | 5.13 | 0.04 | 0.05 | 0.05 | 96.7 | 32.6 |
| Potassium | 0.07 | 7.96 | 0.04 | 0.07 | 95.0 | 32.2 |
| Calcium | 0.10 | 0.07 | 4.69 | 0.04 | 96.1 | 17.4 |

TABLE IX

| Cation | Alcohol Precipitated | Roll-Dried | Product of this Example |
|---|---|---|---|
| $Na^+$ | 18.2% | 31.8% | 6.1% |
| $K^+$ | 34.6% | 19.4% | 42.4% |
| Total $M^+$ | 52.8% | 51.2% | 48.5% |
| $Ca^{++}$ | 46.9% | 48.3% | 29.9% |
| $Mg^{++}$ | 0.3% | 0.5% | 21.6% |
| Total $M^{++}$ | 47.2% | 48.8% | 51.5% |

Values given are in meq. %

TABLE X

| Sample | Vis. (mPa.s) | % Whey-Off 80 ppm | | 120 ppm | |
|---|---|---|---|---|---|
|  |  | 1 day | 6 days | 1 day | 6 days |
| Control | N.A. | 59 | 66 | 4 | 41 |
| Control | N.A. | 5 | 64 | 0 | 0 |
| A | 66 | 0 | 50 | 0 | 2 |
| B | 46 | 14 | 57 | 14 | 29 |
| C | 12.3 | 0 | 25 | 0 | 0 |
| D | 10.8 | 3 | 37 | 2 | 2 |

TABLE XI

| Sample | Level (ppm) | Regular 24 h., 10° Observations | Time | Add'l. 24 h. after homo'n. Observations | Time | Change in Time |
|---|---|---|---|---|---|---|
| Control | 250 | OK | 32.0 | sl. ring at top | 31.0 | −1.0 |
| Control Std. Prdt. A | 250 | OK | 32.5 | sl. ring | 31.0 | −1.5 |
|  | 260 | OK | 35.0 | dust | 31.5 | −3.5 |
|  | 380 | heavy blurp | 47.5 | blurp | 40.0 | −7.5 |
|  | 430 | very heavy blurp | 58.5 | very heavy blurp | 47.0 | −11.5 |
| Std. Prdt. B | 255 | OK | 36.5 | sl. ring | 34.0 | −2.5 |
|  | 410 | blurp | 53.5 | blurp | 43.5 | −10.0 |
|  | 460 | heavy blurp | 68.5 | heavy blurp | 49.0 | −19.5 |
| E. cot. | 200 | dust | 31.0 | sl. ring | 31.5 | +0.5 |
|  | 300 | OK | 37.0 | sl. ring | 40.0 | +3.0 |
|  | 400 | OK | 48.5 | sl. ring | 49.5 | +1.0 |
|  | 500 | OK | 61.0 | sl. ring, sl. blurp | 64.0 | +3.0 |

TABLE XII

| Use Level (ppm) | Before Homog'n. Observation | Time | After Homog'n. Observation | Time | Change in Time |
| --- | --- | --- | --- | --- | --- |
| 200 | dust | 31.0 | sl. ring | 31.5 | +0.5 |
| 300 | OK | 37.0 | sl. ring | 40.0 | +3.0 |
| 400 | OK | 48.5 | sl. ring | 49.5 | +1.0 |
| 500 | OK | 61.0 | sl.ring, sl.blurp | 64.0 | +3.0 |
| 600 | OK | 76.5 | sl. blurp | 79.5 | +3.0 |
| 700 | sl. blurp | 106.5 | sl. blurp | 98.5 | −8.0 |
| 800 | blurp | 149.5 | sl. blurp | 120.0 | −29.5 |
| 900 | blurp | 188.0 | sl. blurp | 155.5 | −32.5 |
| 1000 | blurp | 255.0 | blurp | 192.5 | −62.5 |

TABLE XIII

| Sample | Use Level* (ppm) | Not Homogenized Observation | Time | Homogenized Observation | Time |
| --- | --- | --- | --- | --- | --- |
| Conventional stabilizer | 250 | 80 mm sep'n. brown ring on top heavy settling | 26.5 | 58 mm sep'n. 70 mm mottling** settling | 27.5 |
| | 300 | brown ring on top settled out | 27.5 | 10 mm sep'n. mottling | 30.5 |
| | 350 | brown ring on top separation heavy settling | 28.5 | 4 mm sep'n. mottling lt. dust | 33.0 |
| | 400 | 18 mm sep'n. mottling, settling | 32.0 | v. sl. sep'n. | 36.0 |
| E. cottonii product of this invention | 250 | 105 mm sep'n. heavy settling | 25.5 | 2 mm sep'n. dust | 30.5 |
| | 300 | 97 mm sep'n. mottling/ settling | 26.5 | 2 mm sep'n. | 33.0 |
| | 350 | 45 mm sep'n. heavy settling | 28.0 | OK | 37.5 |
| | 400 | 72 mm sep'n. settling | 28.0 | sl. ring dust | 39.0 |

*Use level after dilution to single-strength.
**Mottling is a term used here to describe what is probably the result of extreme separation, but the appearance of the cocoa-rich separated phase is nonuniform, having a mottled white and brown appearance.

I claim:

1. A modified sulfated hydrocolloid extractive of *Eucheuma cottonii* for use in stabilizing milk-based products, said hydrocolloid in the form of a salt of calcium, magnesium, potassium or sodium or a mixture thereof, being characterized in that the viscosity in a 1.5% water solution is between 5 and 20 mPa.s at 75° C.

2. A modified sulfated hydrocolloid extractive of *Eucheuma cottonii* for use in stabilizing milk-based products, said hydrocolloid in the form of a mixture of calcium, magnesium, potassium, and sodium salts in which the dominant cations are divalent, said hydrocolloid being characterized in that the viscosity in a 1.5% water solution is between 5 and about 10 mPa.s at 75° C.

3. A modified sulfated hydrocolloid extractive of *Eucheuma cottonii* for use in stabilizing milk-based products, said hydrocolloid in the form of a mixture of calcium, magnesium, potassium, and sodium salts in which the dominant cations are alkali metal cations selected from the group consisting of potassium and sodium, said hydrocolloid being characterized in that the viscosity in a 1.5% water solution is between about 10 and 20 mPa.s at 75° C.

4. The hydrocolloid of claim 1, 2 or 3 containing, on a pure, anhydrous basis, from about 22% to 25% sulfate by weight.

5. A chocolate milk stabilized with the hydrocolloid as defined in claim 1, 2 or 3.

6. A chocolate milk of claim 5 wherein the hydrocolloid is present in amounts as to provide a spread of up to about 500 ppm.